US006148858A

United States Patent [19]

Kirkman

[11] Patent Number: 6,148,858

[45] Date of Patent: Nov. 21, 2000

[54] PRESSURE BALANCED COUPLINGS

[75] Inventor: Douglas F Kirkman, Ickenham, United Kingdom

[73] Assignee: Mandeville Engineering Limited, United Kingdom

[21] Appl. No.: 09/153,350

[22] Filed: Sep. 15, 1998

[30] Foreign Application Priority Data

Oct. 1, 1997 [GB] United Kingdom ................... 9720724

[51] Int. Cl.[7] ...................... F16L 37/34

[52] U.S. Cl. .................... 137/614.02; 137/614.04; 137/81.2; 251/282

[58] Field of Search .................... 137/81.2, 614.04, 137/614.02; 251/282

[56] References Cited

U.S. PATENT DOCUMENTS

| | | | |
|---|---|---|---|
| 3,291,152 | 12/1966 | Comer | 137/614.04 |
| 3,910,312 | 10/1975 | Weinhold . | |
| 4,226,257 | 10/1980 | Trinkwalder | 137/81.2 |
| 4,269,389 | 5/1981 | Ekman | 251/149.6 |
| 4,625,759 | 12/1986 | Craig | 137/81.2 |
| 4,768,551 | 9/1988 | Allread et al. . | |
| 4,832,080 | 5/1989 | Smith, III | 137/614.04 |
| 5,129,423 | 7/1992 | Fournier et al. | 137/614.05 |
| 5,365,972 | 11/1994 | Smith, III | 137/614.04 |
| 5,385,169 | 1/1995 | Odelius . | |
| 5,469,887 | 11/1995 | Smith, III | 137/81.2 |
| 5,507,308 | 4/1996 | Chambonnet | 137/81.2 |

FOREIGN PATENT DOCUMENTS

| | | |
|---|---|---|
| 546745 A1 | 6/1993 | European Pat. Off. . |
| 898955 | 6/1962 | United Kingdom . |
| 2 279 714 | 1/1995 | United Kingdom . |
| WO 95/33158 | 12/1995 | WIPO . |

*Primary Examiner*—Charles R. Eloshway

*Attorney, Agent, or Firm*—Nixon & Vanderhye PC

[57] ABSTRACT

A sub-sea coupling comprises a male probe coupler and a female receiver coupler containing mutually engageable poppet valves which have intermediate valve heads between nose and shank portions which seal with respect to the respective couplers. Each valve has a longitudinal passageway allowing balancing of the poppet valve with respect to external pressure. Further, the poppet valves have substantial equality in effective area between the valve portions and the nose and shank portions so that the poppet valve is substantially balanced with respect to line pressure in the line to which the coupler is connected. The arrangement gives a high resistance to the ingress of sea water to the couplers while substantially avoiding any hydraulic lock or wash-out during make-up and separation of the couplers.

19 Claims, 1 Drawing Sheet

PRESSURE BALANCED COUPLINGS

FIELD OF THE INVENTION

This invention relates to coupling high pressure fluid lines particularly those used in or for sub-sea exploration and extraction and particularly concerns a substantially balanced coupling intended to be capable of use at very great sea depths.

BACKGROUND TO THE INVENTION

Sub-sea couplings for high pressure hydraulic lines are well known. Most embodiments comprise a mating pair of couplers, of which the male coupler has a probe which is received in a socket in the female coupler and both couplers contain a self-sealing poppet valve disposed so that when the couplers are mated the poppet valves mutually engage whereby they are lifted off their respective seats and allow hydraulic flow between the couplers.

Very substantial efforts have been made to achieve designs which are efficient and durable, which avoid the ingress of sea water when the couplers are made up or disengaged and which avoid hydraulic lock and which do not require high insertion or separation forces.

SUMMARY OF THE INVENTION

This invention is principally a coupling which provides a pressure-balanced joint mainly for use in sub-sea hydraulic supply lines. Preferably it comprises a male coupler and a female coupler each containing valve members which close and seal against line pressure when the couplers are separated. These male and female couplers are termed self-sealing couplers because the action of separation causes them to close off the ends of the lines to which they are connected. When the couplers are mated, the valves are opened and pressurised flow is permitted to pass between the couplers. At least one and preferably each coupler is arranged so that, before the coupling is made up, the forces on the valve due to external pressure are substantially balanced. This may be achieved by providing in the respective valve a longitudinal passageway by means of which external pressure due to sea water is communicated from a forwardly facing portion (e.g. a front face) of the valve to a rearwardly facing portion (e.g. a rear face) of the valve. The valve members in the male and female couplers each preferably comprise a shank, a poppet head and a nose, configured so that the valve member is preferably balanced or only slightly unbalanced with respect to internal (line) pressure. Thus line pressures on the valve members do not create the very high seating load which occurs with normal unbalanced couplings that have to forced open during make-up.

BRIEF DESCRIPTION OF THE DRAWING

The single

DETAILED DESCRIPTION

Figure 1:
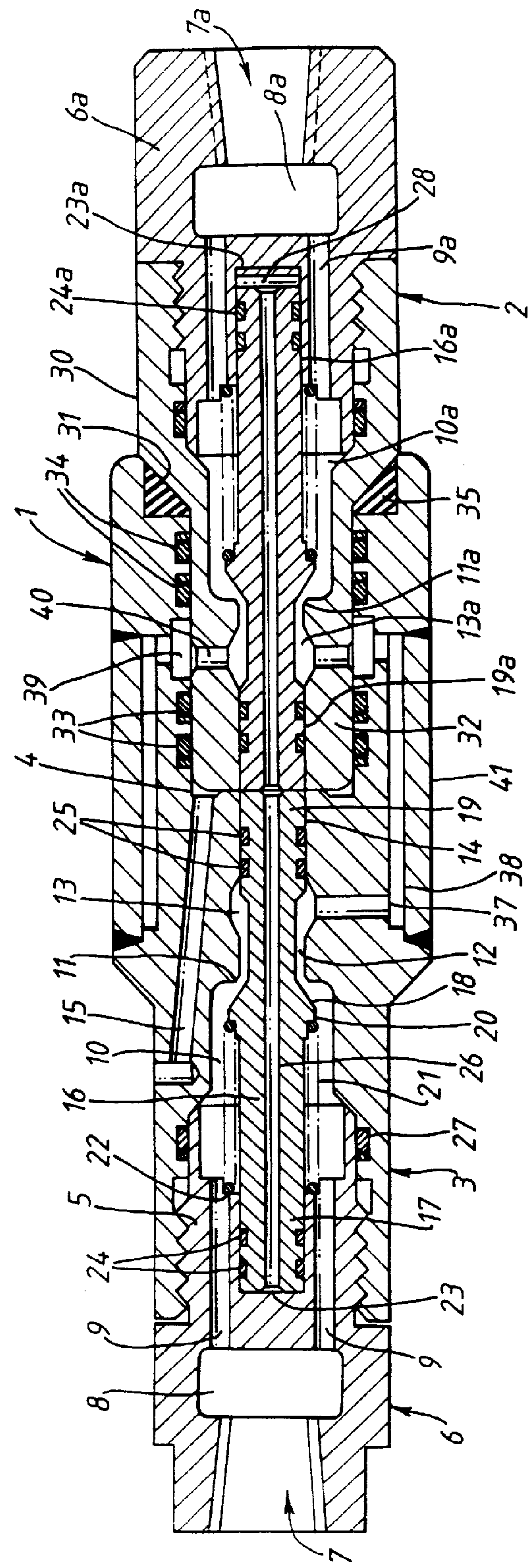
FIG. 1 illustrates an embodiment of a coupling according to the invention.

FIG. 1 illustrates by way of a preferred example one embodiment of a coupling 1 which comprises a male coupler 2 matched to a female coupler 3. The female coupler provides a socket 4 into which the male coupler is received when the coupling is made up. The body of the female coupler has at its end remote from the socket 4 an internal threading 5 which receives a connector 6 enabling a connection of a hydraulic line to be made to the coupler. The connector has an aperture 7 which is connected to an internal flow chamber 8 within the connector. Passages constituted by drill-ways 9 connect the flow chamber 8 to a chamber 10 within the female coupler. The chamber 10 includes a part conical valve seat 11 and a passage 12 from the valve seat to a flow gallery 13. A bore 14 is provided between the flow chamber 13 and the socket 4 but, as will be seen, this bore is normally occupied by the nose of a respective poppet valve.

A venting passage 15 extends from the socket 4 through the body of the female coupler to the exterior thereof.

The female coupler includes one of two self-sealing valve members, usually called poppets. The poppets in the female and male couplers are very similar and accordingly only that in the female coupler will be described in detail.

The poppet 16 has a rearward portion or shank 17, a conical shoulder or valve head 18, which makes a metal-to-metal seal with the seat 11, and a forward portion or nose 19, the nose 19 being sealingly accommodated within the bore 14. Slightly rearwardly of the head 18 the shank has a shoulder 20 supporting one end of a helical compression spring 21 of which the other end is accommodated in a shoulder 22 in the connector 6. The shank 17 extends into a central blind bore 23 in the connector 6. A radial seal between the shank and connector, and thereby between the poppet valve and the female coupler, is provided by the seals 24 which are preferably elastomeric seals disposed in peripheral recesses in the shank and engaging the adjacent inner side of the bore into which the shank extends. Similarly, the nose 19 carries seals 25, preferably elastomeric O-ring seals disposed in peripheral annular recesses in the nose portion and providing a radial seal between the nose and the bore 14 into which it fits.

As shown, the poppet 16 preferably is of substantially the same length as the distance between the socket 4 and the end of the blind bore 23.

The poppet has an internal longitudinal bore 26. The purpose of this, as will be apparent later, is to assist in the balancing of the poppet valve with respect to external hydraulic pressure.

The connector 6 and the remainder of the female coupler are mutually sealed by means of an elastomeric seal 27 disposed in an internal annular recess adjacent the periphery of the connector 6.

As previously noted, the poppet **16*a* in the male coupler closely resembles the poppet 16 and accordingly the poppet 16*a* will not be described in detail. It is sufficient to note that the male coupler includes a connector 6*a* having an aperture 7*a* and flow chamber 8*a* connected by way of chamber 10*a*, valve seat 11*a* to flow chamber 13*a*. In this embodiment however the poppet valve 16*a* is slightly shorter than the distance between the tip of the probe of the male coupler and the bottom of the blind bore 23*a* corresponding to bore 23, so that a clearance 28 exists between the rear end of the shank and the bottom of the blind bore 23*a***. This clearance is required because the poppets must not form a mechanical stop on make-up of the coupling. However, an excessive clearance would give one of the poppets a tendency to check the fluid flow.

The main body of the male coupler has a larger diameter part 30 which narrows by way of a conical transition 31 to a probe 32. The probe 32 is a close fit within the socket 4 of the female receiver. Seals between the probe and the socket are provided at spaced-apart locations along the probe and the socket. The seals are in the present embodiment constituted by the pairs of seals 33 and 34, each seal comprising an elastomeric O-ring disposed within an annular recess on the inner side of the socket.

At its open end, the socket 4 has a insert 35 constituting a capturing cone which is engaged by the conical transition 31 when the couplers are fully engaged. The insert is provided to assist, in combination with the rounded front margin of the probe, the entry of the probe 32 into the socket 4.

Fluid flow between the couplers occurs by way of a path which by-passes the noses 19 and 19*a* of the poppets and extends from the flow chamber 13, which is between the intermediate head 18 of the poppet 16 and the nose 19. The path comprises has an outwardly extending passageway 37 and an annular cavity 38 formed between the main body of the female coupler and a tube 41 which is welded in place. The cavity is in communication with a gallery 39 formed as an annular groove in the inner periphery of the socket at a location between those of the seals 33 and 34 when the couplers are engaged. When the probe is fully inserted in the socket, the gallery 39 is in approximate register with radial passageways 40 extending from the outer periphery of the probe to the flow chamber 13*a,* which resembles the flow chamber 13 and is likewise disposed between the valve seat 18*a* and the seals at the forward end of the poppet 16*a*.

When the poppet valve 16*a* is opened, the chamber 13*a* is in communication with the chamber 10*a,* the bores 9*a,* the flow chamber 8*a* and the aperture 7*a* in the connector 6*a* for the male coupler.

The process of make-up of the coupling is as follows.

The process commences when the probe enters the socket 4. This phase of make-up is termed 'capture' and enables the couplers to properly align themselves. The process is assisted by the capturing cone 31 and the radiused front periphery of the probe.

Partial make-up occurs when the probe passes the O-rings 34, so that a radial seal is formed between the probe and the socket. In this phase of make-up, fluid, normally sea water, in the socket 4 is expelled by way of the venting passage 15. No hydraulic lock can occur during make-up.

The final travel of the probe into the socket causes mutual engagement of the poppets and the poppets are each pressed backwards against the force of the respective restoring spring. The valve heads lift from the valve seats 11 and 11*a* so that fluid can flow from the male coupler to the female coupler by way of the flow path 37, 38 and 39. Because the flow path is already fully prepared before the poppets open, there will be no external leakage from either of the lines connected to the couplers or any damage to or wash-out of any of the seals due to a sudden in-rush or out-rush of fluid.

When the couplers are separated, the first phase of separation allows the poppets to close so as to provide a seal between the lines to which the couplers are connected and the flow path extending between the flow chambers 13 and 13*a*. Further separation of the couplers draws in sea water or air as the case may be through the vent 15. It may be noted that there is no tendency to produce any vacuum as the couplers separate. Further, there is no danger or wash-out of any seal. There is no substantial extraction force required by the pressure of sea water acting on unbalanced areas against an evacuated socket.

A feature of the invention, particularly important when the couplers are to be used sub-sea, is the balancing of the poppet valve members 16 and 16*a* so that before the male and female couplers are made up, possibly at very great depths of sea water, there is substantially no great unbalanced pressure due to the surrounding fluid, such as sea water acting on the poppets. The balancing in respect of external pressure is provided by the communication between the ends of the poppets so that the pressure on the outer end surface of the poppet is substantially matched by the pressure on the inner or rear end surface. The communication is preferably by way of the longitudinal passage provided by the bore 26. The effective cross-sections of the end faces of the rearward and forward portions 17 and 19 are equal.

The balancing of each poppet with respect to the internal (line) pressure depends upon substantial equality between the effective cross-sectional areas at the shank 17, the valve head 18 and the nose 19 of the poppet. It is convenient to refer to 'diameters' rather than cross-sectional areas because the relevant parts are normally circular. Thus if the diameter Ds of the shank is equal to the diameter Dv at the seat and the diameter Dn at the nose, then the poppet is also fully balanced in response to line pressure applied by way of the connector 6 and offers only a small frictional resistance to opening and closing. A fully balanced poppet, having no unbalanced area for line pressure to act, would therefore, apart from friction, open and close without any load arising from line pressures which range typically from 0 to 1500 bar. Likewise, a fully balanced poppet is not affected by any external pressure. Deep water giving, for example, an external pressure of 400 bar would not therefore tend to open the poppet valves. The ingress of sea water can be prevented at any depth.

In practice, a slight unbalance to the poppet is desirable to ensure secure closing of the valve. The poppets' springs give sealing at a very low line pressure, typically one bar. If for example there is a slight increase in diameter such as for example 0.2 millimeter increase in the diameter Dv relative to diameters Ds and Dn, there will be an unbalanced seating force which assists the spring in giving metal-to-metal sealing of the poppet head. It is easy to arrange for the maximum load deriving from this unbalance to be, typically, 200 newtons at a line pressure of 700 bar so that the poppets would be manually operable.

An increase in the diameter Dv relative to diameters Ds and Dn is also an aid to assembly because the nose and its seals must pass through the diameter Dv.

The consequence of a slight partial imbalance is that there will be an external depth at which the spring for the poppet can no longer resist the unbalanced load due to external pressure, which will act on the poppet's valve diameter because the flow path 37 is open to the exterior when the couplers are disengaged. In practice this does not matter because the lines to which the couplers are connected are filled with hydraulic fluid when they are deployed and ingress of sea water would in practice only occur if there were a large difference between the internal line pressure and a greater external pressure of the sea water. Provided that the unbalance in the poppet is slight, the difference would have to be very large, typically more than 300 bar, for ingress of sea water to occur.

I claim:

1. A fluid coupling comprising:

a female coupler having a socket and a male coupler having a probe receivable in said socket, each coupler including a respective valve member which is movable to close a respective passageway through the coupler and openable when the couplers are mated, wherein each valve member is configured such that internal fluid pressure in the respective passageway produces at least partially balanced forces on said valve member, and means for exposing different portions of each of the valve members to the external fluid pressure when hydraulic fluid surrounds the coupling whereby to produce substantially balanced forces due to said external fluid pressure on each of said valve members.

2. A fluid coupling as in claim 1 wherein each valve member comprises:

a front and a rear portion in sealing relationship with the respective coupler, the front portions of the valve members being disposed to engage each other when the couplers are mated, and a valve closure portion in said passageway and intermediate said front and rear portions.

3. A fluid coupling as in claim 2, wherein for each said valve member the said front and rear portions and the valve closure portion have effectively the same cross-sectional area in respect of said internal fluid pressure.

4. A fluid coupling as in claim 2 wherein:

the valve closure portion has a different effective cross-sectional area in respect to internal fluid pressure to those of said front and rear portions, whereby internal fluid pressure tends to close the valve.

5. A fluid coupling as in claim 2 wherein the means for exposing comprises, for each valve member:

a respective longitudinal internal passageway in said each valve member, said passageway connecting regions adjacent opposite ends of the respective valve member.

6. A fluid coupling as in claim 5 wherein:

said front, rear and valve closure portions are intermediate said regions.

7. A fluid coupling as in claim 1, wherein:

said socket communicates with the exterior by way of a vent passage through the female coupler whereby mating of the couplers expels fluid through said vent passage.

8. A fluid coupling as in claim 1, wherein:

said probe and socket are mutually sealed in two locations spaced apart along the probe; and a passageway for fluid transfer between the couplers extends from the said passageway inside said male coupler, between said locations, and through the female coupler to the said respective passageway inside the female coupler.

9. A sub-sea fluid coupling comprising:

a female coupler having a socket and a male coupler having a probe receivable in said socket, each coupler including a respective valve member which is movable in a direction to close a respective passageway through the coupler and openable by engagement with the other coupler, wherein each coupler includes means for providing communication between the ends of said respective valve member whereby to produce in the direction of movement of said respective valve member substantially balanced forces due to the external hydraulic pressure on said respective valve member when the coupling is surrounded by hydraulic fluid.

10. A sub-sea fluid coupling as in claim 9, wherein each valve member comprises:

a first and a second portion in sealing relationship with the respective coupler;

a valve closure part in said passageway and intermediate said first and second portions; and an internal longitudinal passageway communicating said external hydraulic pressure between said ends.

11. A sub-sea coupler comprising:

a body which has an internal passageway for coupling to a fluid pressure line, a movable valve member having a first portion and a second portion each in sealing relation with said passageway, and a valve closure portion between said portions and adapted to engage a valve seat in said passageway, wherein said portions are dimensioned so that the member is at least partially balanced with respect to fluid pressure within the passageway; and wherein the valve member has opposite faces which are exposed to external hydraulic pressure when the coupler is surrounded by hydraulic fluid and have equal effective cross-sections, whereby said external hydraulic pressure produces substantially balanced forces on said valve member.

12. A sub-sea coupler as in claim 11, wherein:

said valve member includes an internal longitudinal passageway communicating said external fluid pressure between said opposite faces.

13. A sub-sea coupler as in claim 12, wherein:

said first and second portions and said valve closure portion are positioned intermediate said opposite faces.

14. A sub-sea coupler as in claim 13, wherein:

said valve member is a spring loaded poppet valve having a nose portion and openable in response to force on said nose portion.

15. A sub-sea coupler as in claim 14, wherein:

said valve closure portion is intermediate the ends of the valve member and said valve member has an internal longitudinal passageway between said ends.

16. A sub-sea coupler comprising:

a body which has an internal passageway for coupling to a fluid pressure line, and a movable valve member having a valve closure portion adapted to engage a valve seat in said passageway, wherein said valve member has opposite faces which are in communication and are thereby both exposed to the external hydraulic pressure when the coupler is surrounded by hydraulic fluid and have equal effective cross-sections, whereby said external hydraulic pressure produces substantially balanced forces on said valve member.

17. A sub-sea coupler comprising:

a body which has an internal passageway for coupling to a fluid pressure line, a movable valve member having a valve closure portion adapted to engage a valve seat in said passageway;

wherein said valve member has a front portion for depression into said body when said coupler mates with a co-operative coupler and a rear portion within said body;

and means for communicating external hydraulic pressure to said rear portion when the coupler is surrounded by hydraulic fluid;

whereby said external hydraulic pressure produces on said rear portion a force opposing the force of said external hydraulic pressure on said front portion.

18. A sub-sea coupler according to claim 17, wherein said means for communicating comprises an internal longitudinal passageway extending from said front portion to said rear portion.

19. A sub-sea coupler according to claim 17, wherein:

said front portion and said rear portion are each in sealing relation with said passageway;

said valve closure portion is disposed between said front and rear portion; and wherein said valve member is at least partially balanced with respect to fluid pressure within the passageway.

* * * * *